United States Patent Office 3,108,857
Patented Oct. 29, 1963

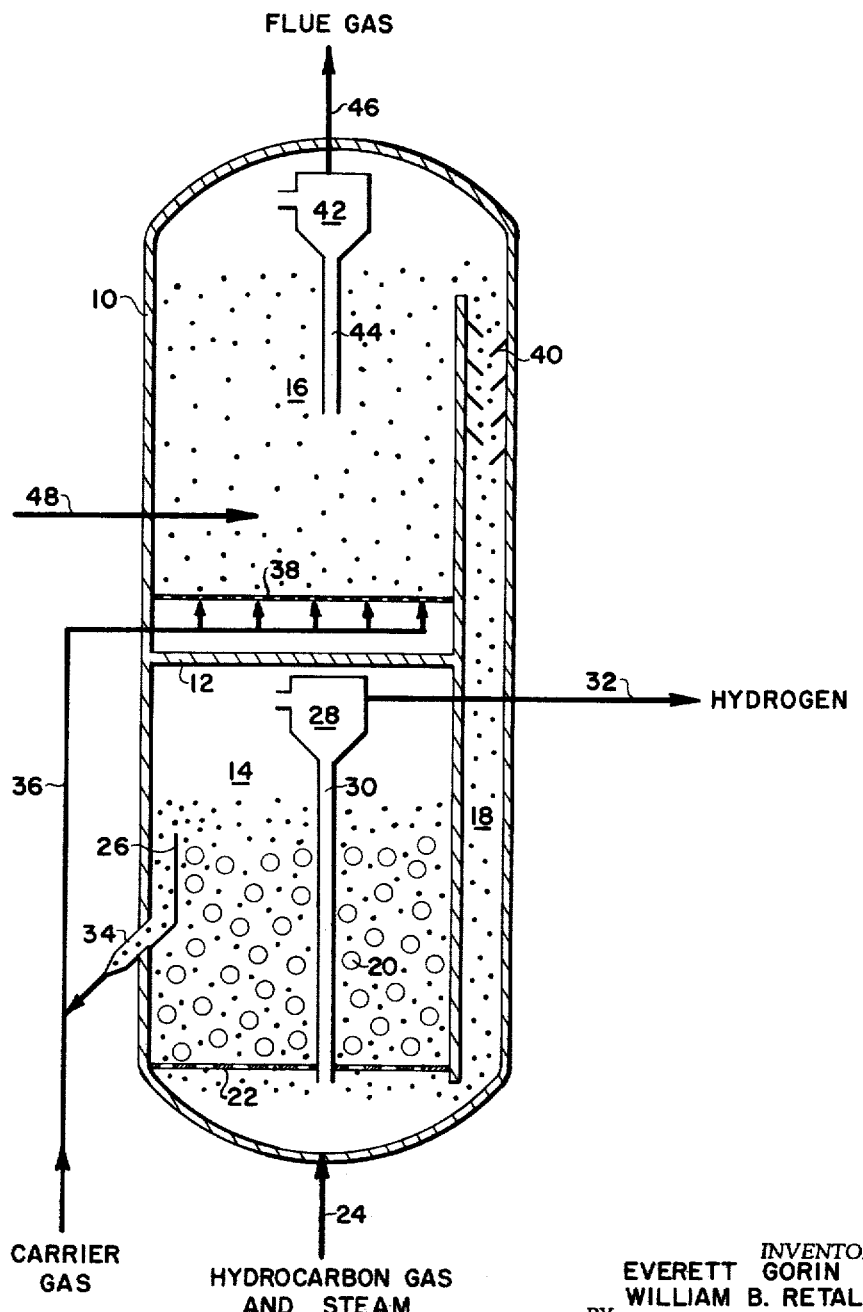

3,108,857
METHOD FOR THE PRODUCTION OF HYDROGEN
Everett Gorin, Pittsburgh, and William B. Retallick, Canonsburg, Pa., assignors to Consolidation Coal Company, Pittsburgh, Pa., a corporation of Pennsylvania
Filed Apr. 10, 1961, Ser. No. 101,777
5 Claims. (Cl. 23—212)

The invention relates to a method for the production of hydrogen. More particularly, this invention relates to an improved continuous method for the simultaneous production and purification of a hydrogen-rich gas to yield high purity hydrogen.

Hydrocarbon gas, for example, methane, may be converted to a hydrogen-rich gas via a conventional type steam-hydrocarbon reforming process, generally referred to as the steam-reforming process. The steam-reforming process comprises reacting hydrocarbon gas with steam in the presence of a conventional type steam-reforming catalyst. The products obtained from the steam-reforming reaction generally consist of hydrogen in admixture with a substantial amount of carbon dioxide. When hydrogen is used commercial, however, it is normally desirable that the hydrogen be so-called "high purity" hydrogen, i.e., hydrogen which is essentially free of any gaseous contaminants.

Numerous purification processes have been employed for purifying the hydrogen-rich gas obtained via the steam-reforming reaction. One purification process, which is particularly advantageous, comprises combining the production of the hydrogen rich gas with the purification of the gas such that the two processes are conducted simultaneously in one reaction zone. Such a combination type process may be obtained by subjecting a mixture of hydrocarbon gas and steam to treatment in a reaction zone wherein a mixture of a carbon dioxide acceptor material and a steam-reforming catalyst is maintained. The steam-reforming catalyst catalyzes the reaction between the hydrocarbon gas and steam whereby hydrogen and carbon dioxide are formed. As carbon dioxide is formed, the carbon dioxide simultaneously reacts with the carbon dioxide acceptor material and is absorbed thereon. As a result, high purity hydrogen is recovered from the reaction zone.

If methane is the hydrocarbon gas, and calcium oxide, commonly called lime, is the carbon dioxide acceptor material, the following reactions exemplify the above combination process:

Reaction 1—$CH_4 + 2H_2O = CO_2 + 4H_2$
Reaction 2—$CO_2 + CaO = CaCO_3$

There are a number of advantages in conducting the above reactions together. For example, removing the carbon dioxide as it is formed enable the steam-reforming reaction to continue to completion, that is, substantially all of the hydrocarbon gas is converted. Obviously, this eliminates the necessity for removing unconverted hydrocarbon gas from the reaction products. Furthermore, by combining the reactions, it has been found that the over-all reaction, i.e., Reaction 3—$CH_4 + 2H_2O + CaO = CaCO_3 + 4H_2$ is essential thermoneutral. The above Reaction 1 is highly endothermic while Reaction 2 is high exothermic.

One particular method for conducting the above combination hydrogen-rich gas production (steam-reforming) and purification (carbon dioxide acceptor) process is described in a patent to Roger Williams, Patent No. 1,-938,202. Williams discloses producing high purity hydrogen by reacting steam with methane in an reaction zone, in the presence of a mixture of lime and steam-reforming catalyst maintained therein. As previously mentioned, as carbon dioxide is produced via the steam-reforming reaction, the carbon dioxide reacts with the lime to form calcium carbonate. In order to maintain the efficiency of the steam-reforming reaction, it is necessary that an adequate amount of lime be present to absorb the carbon dioxide. Williams prevents the steam-reforming reaction from slowing down by continuously introducing a fresh mixture of lime and steam-reforming catalyst and continuously withdrawing reforming catalyst and reacted lime, i.e., calcium carbonate. The used charge of lime and reforming catalyst is withdrawn from the reaction zone in admixture with the reaction products, i.e., the high purity hydrogen. The charge of catalyst and calcium carbonate is separated from the reaction products, regenerated and preferably reintroduced into the reaction zone.

In contrast to the frequent regeneration which the carbon dioxide acceptor, i.e. the lime, requires, the steam-reforming catalyst requires essentially no regeneration. However, in the Williams process both the reacted lime and the steam-reforming catalyst are withdrawn from the reaction zone. Moreover, in addition to the unnecessary removal of the reforming catalyst, it has also been found that it is particularly harmful to the steam-reforming catalyst to maintain the catalyst under the conditions employed to regenerate the lime. Thus, if the lime and reforming catalyst are withdrawn from the reaction zone together, it is preferred, prior to regenerating the lime, that the reforming catalyst be separated from the lime.

Obviously, in view of the above, it is highly desirable that a continuous process be available for simultaneously conducting the steam-reforming reaction and the carbon dioxide acceptor reaction so that reacted carbon dioxide acceptor particles may be continuously withdrawn, regenerated, and reintroduced into the reaction one separated from the steam-reforming catalyst. Furthermore, it is still more desirable if, in addition to continuously, separately withdrawing carbon dioxide acceptor particles from the reaction zone, high purity hydrogen produced therein may be continuously withdrawn from the reaction zone separately from the acceptor particles.

The primary object of this invention is to provide an improved continuous process for producing high purity hydrogen.

Another object of this invention is to provide an improved contiuous process for simultaneously producing and purifying hydrogen-rich gas.

A further object of this invention is to provide an economic process for producing high purity hydrogen comprising combining a steam-reforming reaction with a carbon dioxide acceptor reaction whereby high purity hydrogen is continuously obtained from the reaction zone substatially free of reforming catalyst and carbon dioxide acceptor, and carbon dioxide acceptor is continuously obtained from the reaction zone substantially free of reforming catalyst.

In accordance with our invention, an inventory of steam-reforming catalyst and an inventory of carbon dioxide acceptor are maintained within a reaction zone. The inventory of catalyst is maintained within the reaction zone in the form of a fixed bed such that interstices exist between the individual catalyst particles wherein the carbon dioxide acceptor particles may be maintained in a fluidized state. A fluidizing quantity of hydrocarbon gas and steam is introduced into the reaction zone to maintain the carbon dioxide acceptor in a fluidized state therein, at least a portion of the fluidized bed of acceptor particles being maintained within the aforementioned fixed catalyst bed interstices. The steam and hydrocarbon gas react in the presence of the carbon dioxide acceptor and the catalyst under conditions to yield high purity hydrogen.

For a better and more complete understanding of our invention, its objects and advantages, reference should be had to the following description and to the accompanying drawing which is an illustration, partly diagrammatic and partly cross-sectional, of a unitary reaction vessel which includes a hydrogen-rich gas production and purification zone and a calcination zone.

PREFERRED EMBODIMENT

The following, with reference to the drawing, is a description of the preferred embodiment of this invention.

Referring to the drawing, a reaction vessel 10 of generally cylindrical configuration is shown. Reaction vessel 10 is divided by a horizontal imperforate partition 12 into a hydrogen-rich gas production and purification zone 14 (hereinafter referred to as hydrogen production zone 14) and a calcination zone 16. The hydrogen production zone 14 is in communication with the calcination zone 16 via a standpipe 18. The standpipe 18 enables acceptor particles to be passed from the calcination zone 16 into the hydrogen production zone 14, as will be more fully explained hereinafter.

Steam-reforming catalyst in the form of a fixed bed 20 is maintained in the hydrogen production zone 14 on a grid 22. The physical arrangement of the individual catalyst particles within the fixed catalyst bed 20 is such that interstices exist between the individual catalyst particles. For ease in understanding the operation of the hydrogen production zone 14, in the drawing the size of the interstices between the catalyst particles is exaggerated.

The steam-reforming catalyst generally comprises particles having a particle diameter in the range of about ¼ to 1 inch, preferably about ¼ to ½ inch. The catalyst may be any of the conventional type steam-reforming catalysts employed by those skilled in the art, e.g., nickel, cobalt, iron or copper. Preferably, the steam-reforming catalyst is a supported catalyst, the support being for example, alpha alumina or magnesia. If desired, the fixed support may be vertically stacked or dumped Raschig rings. It is to be understood, however, that any type of dump packing which possesses a large free volume may be employed as the fixed support.

On inventory of carbon dioxide acceptor particles, for example, lime, is also maintained in the hydrogen production zone 14 above the grid 22. The carbon dioxide acceptor comprises particles having a size consist such that the acceptor particles may be maintained in a fluidized state within the interstices of the fixed catalyst bed 20. Normally the acceptor particles have a size consist within the range of about 8 x 200 mesh Tyler standard screen.

A mixture of steam and a hydrocarbon gas is introduced via a conduit 24 into the hydrogen production zone 14. The hydrocarbon gas may be any of the commonly used hydrocarbon gases either alone or in admixture may be employed: methane, and $C_1$ to $C_5$ hydrocarbons. The exact ratio of steam to hydrocarbon gas introduced into the hydrogen production zone 14 is primarily dependent upon the particular hydrocarbon gas. The mols of steam required may be defined on the basis of the total mols of carbon in the gas fed to the zone 14. The ratio of mols of steam to mols of carbon is generally at least 2 and may be as high as 5.

The gaseous mixture of hydrocarbon gas and steam is introduced into the hydrogen production zone 14 such that the upward velocity of the mixture is sufficient to maintain the carbon dioxide acceptor particles in the form of a fluidized bed within the zone 14. As previously mentioned, at least a portion of the fluidized bed 20 of steam-reforming catalyst. In addition, the fluidized bed of acceptor is maintained so that acceptor particles may be continuously and separately withdrawn from the zone 14. As can be seen from the drawing, the top of the fixed bed 20 is conveniently located below the top of a baffle 26, while the top of the fluidized bed of acceptor particles is maintained above the top of the baffle 26. Thus acceptor particles overflow the baffle 26 and are withdrawn from the hydrogen production zone 14 separately from the fixed bed catalyst particles, as will be hereinafter more fully explained. Any convenient means by which the acceptor particles may be withdrawn separately from the fixed bed catalyst particles may be employed however.

The upward velocity of the mixture of steam and hydrocarbon gas is generally within the range of about 0.5 foot per second to 3.0 feet per second. For example, if the carbon dioxide acceptor particles have a size consist within the range of about 35 to 48 mesh Tyler standard screen, a fluidizing velocity of about 0.7 to 2.0 feet per second is adequate. Simple experimentation will enable one to ascertain the exact fluidizing velocity which should be employed.

The hydrogen production zone 14 is maintained under the following conditions of temperature and pressure: a temperature within the range of about 1200° to 1600° F.; and a pressure within the range of about 5 to 20 atmospheres. It has been found that these operating conditions are favorable to both the steam-reforming reaction and the carbon dioxide acceptor reaction. It has also been found that it is desirable to maintain a temperature gradient within the zone 14. The purity of the hydrogen produced via the steam-reforming reaction may be increased, for example, by establishing a temperature gradient of at least 100° F. between the top and bottom of the fluidized bed of carbon dioxide acceptor particles, the higher temperature being at the steam-hydrocarbon mixture inlet end. We have found that by maintaining portions of the fluidized bed within the interstices of the fixed catalyst bed, the normal top to bottom mixing of a fluidized bed is decreased and thus the afore-mentioned temperature gradient may be maintained.

The carbon dioxide acceptor may be any of the conventional type acceptors employed by those skilled in the art. Usually the carbon dioxide acceptor is an alkaline earth oxide, i.e., an oxide of calcium, barium, or strontium. Because of cheapness and abundance of supply, the acceptor is preferably calcium oxide, better known as lime. If desired, the lime may be supported on a refractory basic oxide, such as magnesium oxide, to provide greater physical strength; or a natural magnesia bearing lime, i.e. dolomite, may be employed. Obviously, the amount of carbon dioxide acceptor employed will depend on the amount of carbon contained in the hydrocarbon gas introduced into the zone 14. For example, if lime is employed as the acceptor, at least one mol of lime should be present for each mol of carbon contained in the hydrocarbon gas circulating through the zone 14.

If lime is employed as the acceptor, it is important to note that the partial pressure of steam within the hydrogen production and purification zone 14 should be less than about 13 atmospheres. As fully disclosed in a patent to E. Gorin, Patent No. 2,705,672, assigned to the assignee of this invention, if the partial pressure of steam is above about 13 atmospheres, the individual particles of lime and calcium carbonate (the lime is converted to calcium carbonate as it absorbs the carbon dioxide) tend to agglomerate, thereby prohibiting fluidization.

Under the above-mentioned conditions, the steam and the hydrocarbon gas react in the presence of the reforming catalyst to form hydrogen and carbon dioxide. The carbon dioxide immediately reacts with the carbon dioxide acceptor that is present within the interstices of the fixed catalyst bed, thereby enabling high purity hydrogen to be obtained. As hereinbefore pointed out, removing the carbon dioxide as it is formed markedly improves the efficiency of the conversion of the hydrocarbon gas via the steam-reforming reaction. Moreover, it is also important to note that the heat evolved from the carbon dioxide acceptor reaction essentially balances the heat required for the steam-reforming reaction. The high purity hydrogen passes into a conventional type cyclone separator 28 wherein entrained solids, if any, are removed. The entrained solids are reintroduced via a standleg 30 into the zone 14 while high purity hydrogen substantially free of solids is withdrawn from the reaction vessel 10 via a conduit 32.

As the carbon dioxide acceptor particles absorb carbon dioxide, the individual particles eventually become saturated, and thus in order to be of further use must be regenerated, i.e., the absorbed carbon dioxide must be evolved. As previously mentioned, one of the main advantages of our invention is that we are able to continuously withdraw the carbon dioxide acceptor particles from the hydrogen-rich gas production and purification zone separately from the steam-reforming catalyst. Acceptor particles continuously flow over the top of the baffle 26 and are withdrawn from the zone 14 via a conduit 34. Steam or other suitable gases may be introduced between the baffle 26 and the cylindrical wall of the reaction vessel 10 in order to control the rate of withdrawal of acceptor particles.

The carbon dioxide acceptor withdrawn from the zone 14 via the conduit 34 is introduced via a conduit 36 into the calcination zone 16. Carrier gas, for example, air, is employed to convey the acceptor particles via the conduit 36 into the calcination zone 16. Sufficient quantities of air are employed so as to maintain the acceptor particles in the form of a fluidized bed within the calcination zone 16 above a grid 38. The fluidizing velocity in zone 16 is generally maintained within the range of about 0.5 foot per second to 5 feet per second, preferably from 1.5 to 3.0 feet per second. The air is also employed as an oxidizing agent in the calcination zone 16, hereinafter more fully explained.

The calcination zone 16 is maintained at a temperature in the range of about 1700° to 2000° F. at which temperature carbon dioxide is evolved from the acceptor particles. Preferably, the calcination is carried out at about the same pressure as within the zone 14; however, lower pressures may be employed if desired. For example, in the system shown in the drawing, the calcination zone will usually be at a pressure level of about 10 to 15 pounds per square inch below the pressure in the hydrogen production zone 14. The lower pressure is primarily due to the hydrostatic difference which exists between the two zones.

Regenerated acceptor particles, that is, acceptor particles free of carbon dioxide, flow into the standpipe 18 and gravitate therethrough into the bottom of the hydrogen production zone 14 at which point upwardly flowing steam and hydrocarbon gas pick up the regenerated acceptor particles and fluidize the particles therein. Steam may be introduced into the standpipe 18 in order to prevent leakage of gases from the calcination zone 16 into the hydrogen production zone 14. The steam also assists in controlling the flow of acceptor particles down the standpipe. Baffles 40 may be employed to further assist in obtaining a gas seal between the two zones.

Flue gas containing evolved carbon dioxide and any entrained acceptor particle fines is introduced into a conventional type cyclone 42 wherein the major portion of the fines is removed from the flue gas and reintroduced into the calcination zone 16 via a conduit 44. The flue gas is withdrawn from the reaction vessel 10 via a conduit 46. If desired, the flue gas withdrawn from the vessel 10 may be introduced into a secondary cyclone separator (not shown) wherein any remaining acceptor fines are separated from the flue gas. The acceptor fines recovered from the secondary cyclone may then be contacted with the product hydrogen stream (recovered form the zone 14 via the conduit 32) in order to further reduce the carbon dioxide content of the product hydrogen. Any conventional gas-solid contacting zone (not shown) may be employed.

In order to provide the necessary heat to maintain the temperature within the zone 16 in the range of about 1700° to 2000° F., a conventional liquid or gaseous hydrocarbon fuel or coal or other hydrocarbonaceous solid fuel is required. The fuel may be introduced into the zone 16 via a conduit 48. Fresh acceptor particles may also be introduced via the conduit 48 in order to make up for any loss of acceptor particles due to attrition. The air used as the carrier gas supplies the oxygen to support the combustion of the fuel.

Rather than supply the stoichiometric amount of air required to burn the fuel completely to carbon dioxide and water, a slight deficiency of air is generally used in the calcination zone 16. Thus a slight reducing atmosphere is maintained in the calcination zone 16, i.e., a small amount of carbon monoxide is always present. In this manner sulfur is evolved as $H_2S$ and thereby fixation of any sulfur contained in the fuel onto the acceptor particles as a sulfate is prevented.

It may be desirable under certain circumstances to provide for an external combustion chamber (not shown) wherein fuel is burned with a deficiency of air to produce hot flue gases. The hot flue gases may then be employed as the carrier gas in the conduit 36. Such a system may be preferred when a high ash solid fuel is employed, coal and derivatives thereof. If coal is employed as the fuel and is combusted in an external zone, for example, a slagging vortex type combustion chamber, the major portion of the ash may be rejected before the flue gases reach the calcination zone 16.

It is to be understood that any conventional type calcination zone may be employed. The only prerequisite is that the carbon dioxide be evolved and the regenerated acceptor particles be continuously reintroduced into the hydrogen production zone 14.

*Example*

A hydrocarbon gas having the following analysis is introduced into a hydrogen production and purification zone.

| Gas: | Mols/mol carbon in gas |
|---|---|
| $H_2$ | 0.0459 |
| $CH_4$ | 0.4823 |
| $C_2H_6$ | 0.1914 |
| $C_3H_8$ | 0.0386 |
| $C_4H_{10}$ | 0.0046 |
| $CO_2$ | 0.0006 |

The above hydrocarbon gas is introduced in admixture with 3.527 mols of steam at a steam to off-gas ratio (mol ratio) of 4.62/1 into the hydrogen production and purification zone. Steam-reforming catalyst is maintained in the form of a fixed bed within the zone, and carbon dioxide acceptor particles are maintained in a fluidized bed. At least a portion of the fluidized bed is maintained within the interstices of the fixed bed of catalyst. The zone is maintained under the following conditions:

| | |
|---|---|
| Temperature (° F.) | 1400. |
| Pressure (atm.) | 12.7 absolute. |
| Carbon dioxide acceptor | CaO. |
| Steam-reforming catalyst | Nickel on α alumina. |
| Space rate (vols gas per vols catalyst space per hour | 200. |
| Feed rate of CaO from regeneration (mols/mol carbon in feed gas) | 1.56 |

As a result of the hydrogen-rich gas production and purification reactions, the following hydrogen-rich gas is obtained substantially free of any solids.

| Gas: | Mols/mol carbon in feed gas |
|---|---|
| Hydrogen | 3.256 |
| CO | 0.0626 |
| $CO_2$ | 0.0417 |
| $CH_4$ | 0.1106 |

Carbon dioxide acceptor is separately removed from the hydrogen-rich gas production and purification zone and is then calcined in the presence of a hydrocarbonaceous solid. The hydrocarbonaceous solid is obtained via the fluidized low temperature carbonization of a coal extraction residue, i.e., the undissolved coal remaining after the solvent extraction of coal. The hydrocarbonaceous solid, better known as char, is oxidized by introducing air into the calcination zone. The conditions maintained in the calcination zone are as follows:

| | |
|---|---|
| Tempertaure (° F.) | 1825 |
| Pressure (atm.) (absolute) | 11 |

A portion of the attrited carbon dioxide acceptor fines is recovered from the calcination zone and is thereafter contacted with the hydrogen-rich gas in a contacting tower. As a result of the further purification treatment, a hydrogen-rich gas having the following composition is obtained.

| Gas: | Mols/mol carbon in feed gas |
|---|---|
| Hydrogen | 3.256 |
| CO | 0.0626 |
| $CO_2$ | 0.0200 |
| $CH_4$ | 0.1106 |

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced other than as specifically illustrated and described.

We claim:

1. A continuous process for producing high purity hydrogen from hydrocarbon gas and steam, which comprises
    (a) maintaining in a reaction zone a fixed bed of particles having interstices therebetween, at least a portion of the particles comprising said fixed bed consisting of steam-reforming catalytic components,
    (b) maintaining an inventory of fluidizable carbon dioxide acceptor particles in said reaction zone, said acceptor particles capable of being maintained in a fluidized state within said fixed bed interstices,
    (c) introducing hydrocarbon gas and steam into said reaction zone in contact with said fixed bed particles and said acceptor particles such that said acceptor particles are maintained in a fluidized state within said reaction zone, at least a portion of the fluidized bed of acceptor particles being maintained within said fixed bed interstices,
    (d) reacting said hydrocarbon gas with said steam in the presence of said fixed bed particles and said acceptor particles to yield high purity hydrogen and
    (e) continuously recovering from said reaction zone high purity hydrogen substantially free of said fixed bed particles and said acceptor particles and continuously recovering carbon dioxide acceptor particles from said reaction zone substantially free of said fixed bed particles.
2. The process of claim 1 wherein said carbon dioxide acceptor is an alkaline earth oxide.
3. The process of claim 1 wherein said carbon dioxide acceptor is lime.
4. A continuous process for the production of high purity hydrogen in a substantially solids-free state, which comprises
    (a) maintaining in a reaction zone a fixed bed of steam-reforming catalyst, said fixed catalyst bed having interstices between the individual catalyst particles,
    (b) maintaining an inventory of fluidizable carbon dioxide acceptor particles in said reaction zone, said acceptor particles capable of being maintained in a fluidized state within said fixed bed interstices,
    (c) introducing hydrocarbon gas and steam into said reaction zone in contact with said fixed catalyst bed and said acceptor particles such that said acceptor particles are maintained in a fluidized state within said reaction zone, at least a portion of the fluidized bed of acceptor particles being maintained within said fixed bed interstices,
    (d) reacting said hydrocarbon gas with steam in the presence of said fixed catalyst bed and said acceptor particles to yield high purity hydrogen,
    (e) continuously recovering from said reaction zone high purity hydrogen substantially free of said fixed bed particles and said acceptor particles, and
    (f) separately and continuously recovering carbon dioxide acceptor particles from said reaction zone substantially free of said steam-reforming catalyst.
5. A continuous process for the production of high purity hydrogen in a substantially solids-free state, which comprises
    (a) maintaining in a reaction zone a fixed bed of steam-reforming catalyst, said fixed catalyst bed having interstices between the individual catalyst particles,
    (b) maintaining an inventory of fluidizable carbon dioxide acceptor particles in said reaction zone, said acceptor particles capable of being maintained in a fluidized state within said fixed bed interstices,
    (c) introducing hydrocarbon gas and steam into said reaction zone in contact with said fixed catalyst bed and said acceptor particles such that said acceptor particles are maintained in a fluidized state within said reaction zone, at least a portion of the fluidized bed of acceptor particles being maintained within said fixed bed interstices,
    (d) reacting said hydrocarbon gas with steam in the presence of said fixed catalyst bed and said acceptor particles to yield high purity hydrogen,
    (e) continuously recovering from said reaction zone high purity hydrogen substantially free of said fixed bed particles and said acceptor particles,
    (f) separately and continuously recovering carbon dioxide acceptor particles from said reaction zone substantially free of said steam-reforming catalyst,
    (g) regenerating at least a portion of said recovered carbon dioxide acceptor particles, and
    (h) thereafter reintroducing at least a portion of said regenerated carbon dioxide acceptor particles into said reaction zone.

References Cited in the file of this patent

UNITED STATES PATENTS

| | | |
|---|---|---|
| 1,938,202 | Williams | Dec. 5, 1933 |
| 2,449,635 | Barr | Sept. 21, 1948 |
| 2,602,019 | Odell | July 1, 1952 |
| 2,705,672 | Gorin | Apr. 5, 1955 |

UNITED STATES PATENT OFFICE
CERTIFICATE OF CORRECTION

Patent No. 3,108,857                                          October 29, 1963

Everett Gorin et al.

It is hereby certified that error appears in the above numbered patent requiring correction and that the said Letters Patent should read as corrected below.

Column 1, line 23, for "commercial" read -- commercially --; line 54, for "enable" read -- enables --; line 63, for "essential" read -- essentially --; same column 1, line 70, for "an" read -- a --; column 2, lines 35 and 36, for "one separated" read -- zone separately --; line 53, for "substatially" read -- substantially --; column 3, line 43, for "On" read -- An --; column 5, line 70, for "form" read -- from --; column 6, line 23, after "employed," insert -- for example, --; lines 58 and 59, for "12.7 absolute)" read -- 12.7 (absolute) --; line 64, after "hour" insert a closing parenthesis; column 7, line 32, for "other" read -- otherwise --.

Signed and sealed this 12th day of May 1964.

(SEAL)
Attest:

ERNEST W. SWIDER                                     EDWARD J. BRENNER
Attesting Officer                                    Commissioner of Patents